United States Patent

Shiraishi et al.

[11] Patent Number: 6,060,151
[45] Date of Patent: May 9, 2000

[54] GLASS SHEET COVERED WITH COLORED FILM

[75] Inventors: Yasunori Shiraishi; Jun Kawaguchi, both of Osaka, Japan

[73] Assignee: Ohashi & Associates, Kanagawa, Japan

[21] Appl. No.: 08/945,535

[22] PCT Filed: Apr. 8, 1996

[86] PCT No.: PCT/JP96/00948

§ 371 Date: Feb. 4, 1998

§ 102(e) Date: Feb. 4, 1998

[87] PCT Pub. No.: WO96/31443

PCT Pub. Date: Oct. 10, 1996

[30] Foreign Application Priority Data

Apr. 6, 1995 [JP] Japan .................................... 7-081016

[51] Int. Cl.[7] ..................................................... B32B 17/00
[52] U.S. Cl. ......................... 428/209; 428/210; 428/328; 428/434; 428/469
[58] Field of Search ................................ 428/328, 209, 428/434, 469, 210

[56] References Cited

U.S. PATENT DOCUMENTS

| | | | |
|---|---|---|---|
| 3,887,383 | 6/1975 | Nesteruk | 106/1 |
| 5,162,145 | 11/1992 | Schaefer | 428/209 |
| 5,693,404 | 12/1997 | Shiraishi | 428/156 |
| 5,744,245 | 4/1998 | Bishop | 428/457 |

FOREIGN PATENT DOCUMENTS 0 501 139 A1  9/1992  European Pat. Off. .......... C09C 1/00

*Primary Examiner*—Timothy M. Speer
*Attorney, Agent, or Firm*—Schwegman, Lundberg, Woessner & Kluth, P.A.

[57] ABSTRACT

A glass panel has a transparent or semitransparent colored film in which fine particles of gold having an average diameter of 10 nm or less are dispersed, the colored film being formed partly or wholly on a surface of a glass panel. The colored film is produced by coating a paste containing a composite material with the fine particles of gold dispersed in a polymeric material, preferably a paste containing a material for suppressing growth of fine particles of gold, on the surface of the glass panel, and heating the glass panel to bake a colored film with the fine particles of gold dispersed therein to the glass panel.

4 Claims, 1 Drawing Sheet

GLASS SHEET COVERED WITH COLORED FILM

TECHNICAL FIELD

The present invention relates to a glass panel having on a surface thereof a colored film which is durable, does not excessively reflect visible light, and is transparent or semitransparent, the glass panel with such a colored film being sightly in appearance.

BACKGROUND ART

One conventional process of forming a colored film on a glass panel employs Ag staining as disclosed in Japanese laid-open patent publications Nos. 56-14454 and 57-95854.

It is also known to employ a lustering solution of a precious metal such as Au or Pd dissolved in rosemary oil to form a colored film according to the screen printing process.

The colored film formed on a glass panel through Ag staining has been disadvantageous in that the colored film tends to suffer color irregularities because the dispersion of Ag somewhat varies depending on the temperature. The colored film is also problematic in practical use since it is poor in wear resistance and acid resistance.

The colored film formed of the lustering solution by the screen printing process is also poor in wear resistance and acid resistance because it is in the form of a foil composed of bonded metal crystals, and suffers a high manufacturing cost because is made of the natural material. Another drawback is that since the colored film produces a metallic luster and has a high reflectance, if the glass panel is used as an automobile glass panel, then it is not preferable from the standpoint of traffic safety due to reflections it produces toward automobiles running behind.

DISCLOSURE OF THE INVENTION

The present invention has been made in view of the problems which the conventional glass panels suffer. It is an object of the present invention to provide a glass panel with a colored film which is durable, does not excessively reflect visible light, and is transparent or semitransparent.

According to the present invention, a glass panel has a transparent or semitransparent colored film in which fine particles of gold having an average diameter of 10 nm or less are dispersed, the colored film being formed partly or wholly on a surface of a glass panel.

The colored film should preferably contain a material for suppressing growth of fine particles of gold. The material for suppressing growth of fine particles of gold may be a compound (typically, an oxide) of a metal such as Al, Ti, Co, or the like.

The surface on which the colored film is formed should preferably have a visible light reflectance of less than 20%. This numerical value of visible light reflectance is obtained when visible light was applied to the glass panel at an incident angle ranging from 0 to 12°.

According to the present invention, a coloring effect due to colloidal coloration of fine particles of color is imparted to a glass panel. The colloidal coloration allows the glass panel to be easily colored uniformly without being subjected to temperature differences during the process of manufacturing the glass panel. The colloidal coloration does not produce excessive reflections of visible light, and hence does not adversely affect environments with reflected light.

Since the fine particles of gold have diameters smaller than a certain value and do not affect the process of bonding a matrix in which the fine particles of gold are dispersed, the colored film is of high hardness and is chemically stable.

BEST MODE FOR CARRYING OUT THE INVENTION

Figure 1:
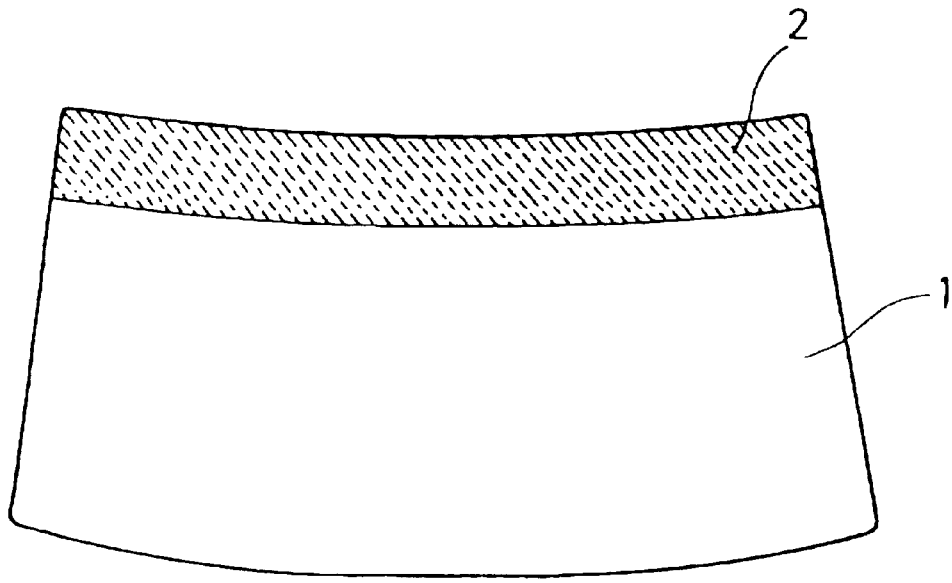
FIG. 1 is a view showing the manner in which a colored film paste is coated on a glass panel in a process of manufacturing a glass panel with a colored film according to the present invention.

A glass panel with a colored film according to the present invention can be manufactured by a process comprising the step of coating, partly or wholly, a surface of a glass panel with a paste containing a composite material composed of fine particles of gold having an average diameter of 10 nm or less and dispersed in a polymeric material, and heating the glass panel to bake a colored film with the fine particles of gold dispersed therein to the surface of the glass panel. If the glass panel is to be formed to a predetermined shape and/or tempered, the glass panel which is heated to bake the colored film may be formed and/or tempered with quenching air.

By using the paste which contains a composite material composed of fine particles of gold having an average diameter of 10 nm or less and dispersed in a polymeric material, the dispersed fine particles of gold can easily be fixed to the surface of the glass panel when the glass panel coated with the paste is simply heated. If a process of forming the glass panel which is softened by being heated to a given shape for use as an automobile glass panel or the like, and a process of applying compressed air to the glass panel to produce a tempered glass panel are selectively added, then it is possible to easily and efficiently manufacture a tempered glass panel with a colored film which has the given shape.

The colored film should preferably contain a material for suppressing growth of fine particles of gold, such as a compound (typically, an oxide) of a metal such as Al, Ti, Co, or the like.

Preferred examples of the present invention will be described below.

EXAMPLE 1

A paste to be coated on a glass panel was prepared from the following amounts of materials:

Composite material of fine particles of gold and nylon 11

| | |
|---|---|
| Composite material of fine particles of gold and nylon 11 | 5 wt % |
| Organic acid salt of Co | 15 wt % |
| Modified silicone oil | 2 wt % |
| Cellulose binder | 28 wt % |
| Polyamide binder | 28 wt % |
| Silicone oil | 0.1 wt % |
| Carbitol | 11.9 wt % |
| Cresol | 10 wt % |

The composite material of fine particles of gold and nylon 11 was manufactured as follows:

Nylon 11 was evaporated to a thickness of 30 $\mu$m on a surface of a glass substrate in a vacuum (under $10^{-3}$ Torr), and gold was evaporated to a thickness of 0.5 $\mu$m on the evaporated film of nylon 11 in a vacuum (under $10^{-5}$ Torr).

Then, the glass substrate with the laminated film of gold and nylon 11 formed thereon was heated at 120° C. for 10 minutes.

After the glass substrate was heated, the laminated film of gold and nylon 11 was observed with a transmission electron microscope. The observation revealed that fine particles of gold having diameters ranging from 1 to 10 nm were dispersed in the nylon 11. It is considered that the fine particles of gold were monodispersed when the nylon 11 in a state of nonequilibrium was thermally relaxed in the heating process.

In the paste, the organic acid salt of Co served as an agent for suppressing growth of fine particles of gold or an agent for solidifying fine particles of gold. Specifically, when the paste which contains the composite material of fine particles of gold and nylon 11 was baked to the glass panel, the organic acid salt of Co became cobalt oxide (which is a material for suppressing growth of fine particles of gold or a material for solidifying fine particles of gold) and acted on plasmon electrons of the fine particles of gold, suppressing grain growth of fine particles of gold.

The modified silicone oil served as an agent for forming a glass skeleton. Specifically, when the paste was baked to the glass panel, the modified silicone oil became silicon oxide, which held fine particles of gold dispersed therein and made the colored film durable.

The silicone oil served as a debubblizer, and the Carbitol and the cresol were added as solvents. Two types of resins were added as binders.

Figure 2:
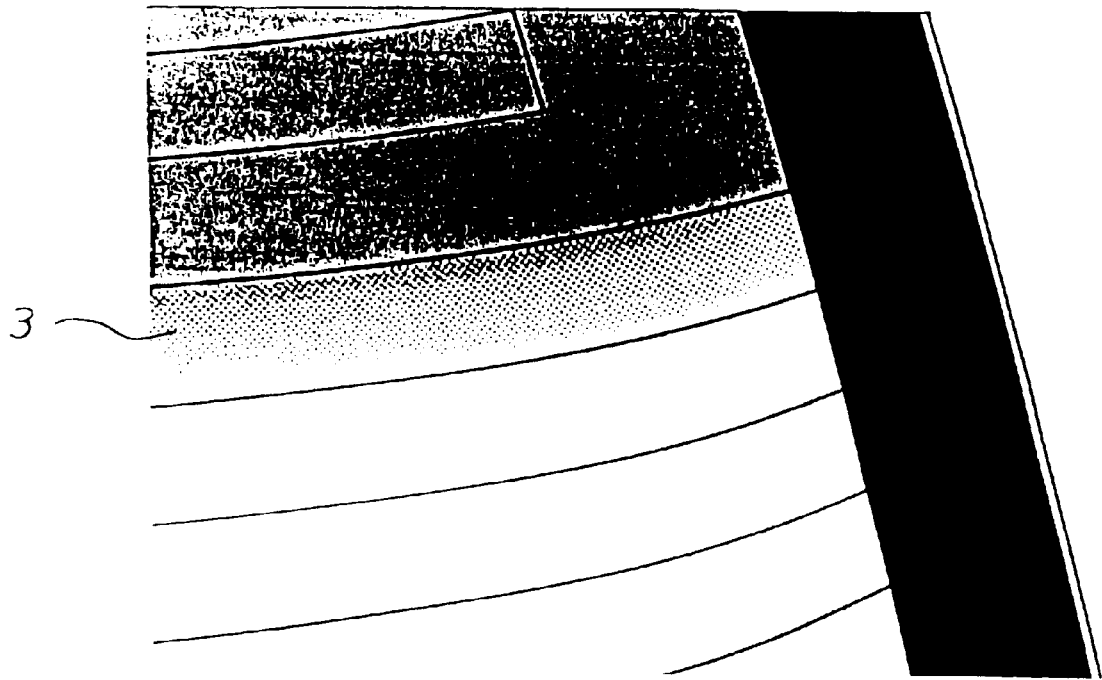
FIG. 2 is an enlarged view of a portion of the glass panel with a colored film according to the present invention.

As shown in FIG. 1, the paste (2) was coated on the glass panel (1) according to screen printing. In order to make the appearance vary continuously between an area where a colored film is formed and an area where no colored film is formed, the boundary area between those areas was coated with the paste in a dot-hole pattern whose radius varies continuously. Such an improvement in the appearance is made possible by preparing the material containing fine particles of gold as a paste having a predetermined viscosity and also by using the screen printing process. One example of such a dot-hole pattern is shown in FIG. 3. Since the glass panel shown in FIG. 2 is an automobile glass panel, it has a heater wire and an antenna wire formed thereon.

The glass panel was then dried at 120° C. for 10 minutes and heated at 600 to 750° C., after which the glass panel was bent and tempered by quenching air, thereby producing a tempered glass panel with a colored film baked thereto for use on automobiles. The colored film of a greyish color had almost no appearance irregularities, and became a sightly shade band on the glass panel.

The colored area (shade band) of the automobile glass panel was measured for visible light transmission and visible light reflectance. The visible light transmission and the visible light reflectance which were measured were 35% and 14%, respectively. The numerical value of visible light reflectance was obtained when visible light was applied to the colored film at 8°.

The colored film was evaluated for wear resistance by a Taber's abrasion resistance testing machine. After testing the colored film under a load of 500 g in 100 revolutions, any change in the haze factor fell within 1%. The colored film was excellent in acid resistance, alkali resistance, and boiling water resistance.

For preparing the paste, the types and amounts of the organic solvent, the organic acid salt of Co, the silicone oil, and the cellulose resin used may be determined so that the colored film will have a desired color and transmittance, and they may be of any types insofar as the solvents and the resins used have good compatibility or dispersability.

For improving wear resistance, a compound of Si such as colloidal silica, a silane coupling agent, or the like may be added.

The glass panel may be annealed rather than being tempered with quenching air, and annealed glass panels may be bonded into a laminated glass panel by PVB (polyvinyl butyral).

EXAMPLE 2

A paste prepared from the following amounts of materials was coated on a glass panel:

Composite material of fine particles of gold and nylon 11 (containing 40 wt % of fine particles of gold)

| | |
|---|---|
| Composite material of fine particles of gold and nylon 11 (containing 40 wt % of fine particles of gold) | 2.5 wt % |
| Titanium acetyl acetonate | 13.8 wt % |
| Silver acetate | 0.8 wt % |
| Polydimethyl siloxane | 1.1 wt % |
| Ethyl cellulose | 10.0 wt % |
| Terebionel | 71.8 wt % |

In the paste, the titanium acetyl acetonate served as an agent for suppressing growth of fine particles of gold or an agent for solidifying fine particles of gold. The polydimethyl siloxane served as an agent for forming a glass skeleton. An observation of the fine particles of gold by a transmission electron microscope indicated that the fine particles of gold had diameters ranging from 1 to 10 nm.

The coated glass plate was bent and tempered by quenching air, thereby producing a tempered glass panel with a colored film baked thereto for use on automobiles. The colored film of a greyish color had almost no appearance irregularities, and became a sightly shade band on the glass panel.

The colored area (shade band) of the automobile glass panel was measured for visible light transmission and visible light reflectance. The visible light transmission and the visible light reflectance which were measured were 31% and 19%, respectively. The numerical value of visible light reflectance was obtained when visible light was applied to the colored film at 8°.

The colored film was evaluated for wear resistance by a Taber's abrasion resistance testing machine. After testing the colored film under a load of 500 g in 100 revolutions, any change in the haze factor fell within 1%. The colored film was excellent in acid resistance, alkali resistance, and boiling water resistance.

According to the present invention, a coloring effect due to colloidal coloration of fine particles of color is imparted to a glass panel, and a glass panel with a colored film is free from coloring irregularities and is highly durable. The colloidal coloration allows the glass panel to be easily colored uniformly without being subjected to temperature differences during the process of manufacturing the glass panel. The colloidal coloration does not produce excessive reflections of visible light, and hence does not adversely affect environments with reflected light. Since the fine particles of gold have diameters smaller than a certain value and do not affect the process of bonding a matrix in which the fine particles of gold are dispersed, the colored film is of high hardness and is chemically stable.

INDUSTRIAL APPLICABILITY

A glass panel with a colored film according to the present invention does not produce excessive reflected light, is durable, sightly in appearance, and used as a glass panel for use on vehicles and buildings. If it is used as a glass panel on an automobile, then it is suitable as a glass panel with a shade band.

What is claimed is:

1. A glass panel characterized in that a colored film in which fine particles consisting of gold having an average diameter of 10 nm or less are dispersed is formed on at least a portion of a surface of a glass panel, and that said colored film is produced by coating a paste containing a composite material with the fine particles of gold dispersed in a polymeric material and an agent for forming a glass skeleton on the surface of the glass panel, and heating the glass panel, and that said glass skeleton holds the fine particles of gold dispersed therein. therein.

2. A glass panel according to claim 1, wherein the surface on which said colored film is formed has a visible light reflectance of less than 20%.

3. A glass panel according to claim 1, wherein said agent for forming a glass skeleton is modified silicone oil.

4. A glass panel according to claim 1, wherein said agent for forming a glass skeleton is polydimethyl siloxane.

* * * * *

UNITED STATES PATENT AND TRADEMARK OFFICE
CERTIFICATE OF CORRECTION

PATENT NO.    : 6,060,151
DATED         : May 9, 2000
INVENTOR(S)   : Shiraishi et al.

Page 1 of 1

It is certified that error appears in the above-identified patent and that said Letters Patent is hereby corrected as shown below:

Column 2,
Line 49, delete "Composite material of fine particles of gold and nylon 11".

Column 4,
Lines 14-15, delete "Composite material of fine particles of gold and nylon 11 (containing 40 wt % of fine particles of gold)".

Claim 1,
Delete "therein. therein." and insert -- therein, and that said colored film contains a compound of Al, Ti or Co as an agent for suppressing growth or solidifying fine particles of gold. --, therefor.

Signed and Sealed this

Thirteenth Day of November, 2001

Attest:

NICHOLAS P. GODICI
Attesting Officer
Acting Director of the United States Patent and Trademark Office